US012654950B2

(12) United States Patent　　　　　(10) Patent No.:　US 12,654,950 B2
Zettler et al.　　　　　　　　　　　　　(45) Date of Patent:　　Jun. 16, 2026

(54) METHOD FOR ANALYZING MALFUNCTIONS IN AN OPERATION OF A HANDLING SYSTEM, METHOD FOR TRAINING OR RETRAINING A CLASSIFIER, COMPUTER PROGRAM AND SYSTEM FOR ANALYZING MALFUNCTIONS

(71) Applicant: Körber Supply Chain Logistics GmbH, Constance (DE)

(72) Inventors: Michael Zettler, Allensbach (DE); Christoph Reichelt, London (GB)

(73) Assignee: KÖRBER SUPPLY CHAIN LOGISTICS GMBH, Constance (DE)

( * ) Notice: Subject to any disclaimer, the term of this patent is extended or adjusted under 35 U.S.C. 154(b) by 372 days.

(21) Appl. No.: 18/390,373

(22) Filed: Dec. 20, 2023

(65) Prior Publication Data

US 2024/0198386 A1　　Jun. 20, 2024

(30) Foreign Application Priority Data

Dec. 20, 2022　(DE) ..................... 10 2022 134 121.6

(51) Int. Cl.
　*B65G 43/08*　　　(2006.01)
　*B07C 1/02*　　　(2006.01)
　*B07C 3/00*　　　(2006.01)
　*G06Q 10/08*　　(2024.01)

(52) U.S. Cl.
　CPC ................ *B65G 43/08* (2013.01); *B07C 1/02* (2013.01); *B07C 3/006* (2013.01); *G06Q 10/08* (2013.01)

(58) Field of Classification Search
　CPC ........... B65G 43/08; B07C 3/006; B07C 1/02; G06N 3/09; G06Q 10/0832; G06Q 10/08
　See application file for complete search history.

(56) References Cited

U.S. PATENT DOCUMENTS

| | | | |
|---|---|---|---|
| 7,079,981 B2 * | 7/2006 | Keller | .................... G06Q 10/08 714/25 |
| 2006/0079992 A1 * | 4/2006 | Pintsov | ............ G07B 17/00435 700/221 |
| 2011/0172973 A1 * | 7/2011 | Richards | ............ G05B 23/0248 703/2 |
| 2013/0131860 A1 * | 5/2013 | Carpenter | ........ G07B 17/00467 700/223 |

(Continued)

FOREIGN PATENT DOCUMENTS

| | | | | |
|---|---|---|---|---|
| CA | 2998389 | 8/2010 | | |
| CN | 111587444 A | * | 8/2020 | ........... G06Q 10/083 |
| JP | H02130607 A | 5/1990 | | |

(Continued)

*Primary Examiner* — Thomas Randazzo
(74) *Attorney, Agent, or Firm* — Price Heneveld LLP

(57)　　　　　ABSTRACT

A method for analyzing malfunctions in an operation of a handling system configured to handle mail items includes identifying at least one characteristic of a mail item to be fed to the handling system to obtain mail item information, detecting a malfunction in an operation of the handling system to obtain malfunction information, determining at least one malfunction mail item or group of malfunction mail items that triggered the malfunction, and assigning the malfunction information with the mail item information of the malfunction mail item or malfunction mail item group.

19 Claims, 4 Drawing Sheets

(56)  References Cited

U.S. PATENT DOCUMENTS

| | | | |
|---|---|---|---|
| 2014/0229001 A1 | 8/2014 | Tsujita | |
| 2022/0180094 A1 | 6/2022 | Dragoset et al. | |

FOREIGN PATENT DOCUMENTS

| | | | | |
|---|---|---|---|---|
| JP | 2015058393 A | 3/2015 | | |
| WO | WO-2005026875 A2 * | 3/2005 | ............. | G06Q 10/08 |
| WO | WO-2006039150 A1 * | 4/2006 | ....... | G07B 17/00661 |

* cited by examiner

Fig. 4

METHOD FOR ANALYZING MALFUNCTIONS IN AN OPERATION OF A HANDLING SYSTEM, METHOD FOR TRAINING OR RETRAINING A CLASSIFIER, COMPUTER PROGRAM AND SYSTEM FOR ANALYZING MALFUNCTIONS

BACKGROUND

The present invention relates to a method for analyzing malfunctions in a handling system operation, a method for training or retraining a classifier to determine evaluation information about mail items to be fed to a handling system, a computer program, and a system for analyzing malfunctions in a handling system operation.

Mail items can cause malfunctions and/or failures during their handling by means of conveyor or sorting technology. Further, if mail items are handled incorrectly, damage to the mail items may occur. Mail items that cannot be handled correctly by a handling system may be referred to as non-conveyable mail items. However, such mail items can still enter handling systems and cause malfunctions there. Furthermore, mail items that are actually considered eligible may cause malfunctions in handling systems due to a special design of the mail items. Malfunctions in handling systems can then lead to failures of the handling systems. Such failures in handling systems often lead to a high manual workload to eliminate the malfunctions. Particularly in the case of mail handling, a failure of handling systems has a particularly serious impact due to the tight time cycle.

WO 2019/161983 A1 discloses a method for detecting ineligible mail items.

Non-eligible mail items are normally transported on conveyor aids. In this respect, problems with such ineligible mail items can rarely occur in implemented processes, since special detection procedures are used to recognize such mail items. However, the detection procedures are limited in their performance and thus mail items that are considered eligible often end up in handling systems, where they then lead to malfunctions.

Therefore, it is an object of the present invention to provide a method and apparatus that can analyze malfunctions in handling systems. Based on such an analysis, suitable countermeasures can be taken.

SUMMARY

According to one aspect of the present invention, there is provided a method for analyzing malfunctions in an operation of a handling system configured to handle mail items. Preferably, the method comprises identifying at least one feature of a mail item to be returned to the handling system to obtain mail item information. Further, the method may comprise detecting a malfunction in an operation of the handling system to obtain malfunction information. In addition, the method may comprise determining at least one malfunction mail item or group of malfunction mail items that caused the malfunction. Further, the method may comprise associating the malfunction information with the mail item information of the malfunction mail item or malfunction mail item group.

Compared to the known prior art, the above method offers the possibility to supplement information collected about mail items with empirical values on how these mail items can be handled in handling systems. Thus, a handling capability of mail items can be estimated based on the characteristics of the mail items. Thus, characteristics of mail items can be assigned a susceptibility to malfunction in the handling of these mail items. Compared to the comparison method known from the prior art, in which only static and predetermined parameters decide whether a mail item is conveyable or not, the method according to the invention can provide a learning or adaptable system. Further, the above method can be used to create a database that assigns characteristics of mail items a specific manageability in the handling system. Consequently, when the above method is used, a handling system can be operated efficiently over the long term because fewer malfunctions occur. In other words, mail items that cannot be handled can be rejected at an early stage or the handling system can be adapted to the mail items. Handling may mean that the item is physically moved. The malfunction and/or failure may thus occur when the item is physically handled. That is, malfunction in the operation of the handling system may occur when physically handling the item. For example, such malfunction may be realized when the mail item is not correctly gripped by a gripper. In addition, malfunction may be realized when a mail item is stuck within the handling machine, for example. In other words, handling of mail items may not mean that the mail item is only scanned of otherwise visually recorded.

The handling system may be, for example, a belt conveyor, a diverter, a crossbelt sorter, a drop device, a singulator, a telescopic conveyor, or a sorter of some other type. The sorter may be configured to sort mail items. Further, the handling system may be a singulator, a buffer, or other mail item handling system. Mail items may be items that are handled in mail centers, for example. Mail items may be packages, parcels bags, pouches or the like. Handling may mean moving, directing, sorting, or otherwise affecting the mail item that is fed to the handling system in some way. In particular, in the handling system, a transport direction and/or an orientation of the mail item is changed. In other words, in the handling system, some action must happen to the mail item in which the handling system must contact the mail item. Identifying at least one feature of a mail item may be performed before the mail item reaches the handling system. In other words, the identifying may be done upstream in the transport direction of the mail item with respect to the handling system. Thus, before the mail item reaches the handling system, the mail item can be identified. During the identification, at least one feature of the mail item may be recorded. The identification of the at least one feature may be realized, for example, by at least one scanner, at least one camera, or the like. Preferably, a six-sided view of the mail item is captured and at least one feature of the mail item is identified by image recognition. The at least one feature may then be stored in the mail item information. The mail item information can identify the mail item individually. This may be implemented, for example, by an identification that is to be newly assigned or by reading an identification that has already been assigned. An identification unit may be provided to perform the identification. The identification unit may be arranged upstream of the handling system with respect to a transport direction. Preferably, the identification unit is an identification unit already present in the mail item handling system. The mail item information may be computer readable data. Preferably, the mail item information is in tabular form. The mail item information may include a mail item ID, at least one mail item characteristic, and/or an object class. Detection of a malfunction of the handling system may be implemented by a monitoring system that may monitor multiple or individual functional sections of the handling system. For example, the motor current of a drive in the handling system may be measured.

For example, if a mail item gets jammed in the handling system, the motor current may increase sharply, which may be detected by the monitoring system. Thereupon, the malfunction information can be obtained. The malfunction information may be indicative that a planned or intended operation of the handling system cannot be performed. Further, a malfunction may also be present if, for example, more mail items are fed to the handling system than are discharged from the handling system. Based on this, it may be detected that a mail item has mistakenly remained in the handling system. In this case, the monitoring system may include one or more photoelectric sensors that can monitor an infeed and/or an outfeed of mail items to and/or from the handling system. Further, a malfunction may also be detected manually. For example, a user may find a mail item that has fallen out of the handling system and report a malfunction accordingly so that malfunction information can be generated. After a malfunction is detected, the causative malfunction mail item can be determined. More specifically, a malfunction can be traced to one or more mail items. If it is possible to identify exactly which mail item caused the malfunction, exactly one malfunction mail item can be determined. If, on the other hand, it is not possible to determine unambiguously whether one or more mail items can be the cause of the recorded malfunction, a malfunction mail item group can be determined. The malfunction mail item group can comprise a large number of mail items. Thus, determining a malfunction mail item or malfunction mail item group may also depend on which monitoring system is designed to determine a malfunction mail item. For example, if the monitoring system is designed to individually track mail items as they pass through the handling system, an individual trouble mail item may be determined. In contrast, with other monitoring systems, such a determination may not be possible. In this case, a malfunction mail item group can be determined that includes, for example, all mail items that are currently present in the handling system (i.e., when the malfunction occurs). The assignment of the malfunction information to the mail item information can be carried out, for example, in such a way that the malfunction information is assigned to the mail item information stored in tabular form. If the malfunction information is only recorded in relation to a single mail item, it is assigned to the mail item information of the malfunction mail item. If, on the other hand, malfunction information is recorded for a plurality of mail items, the malfunction information is assigned to each mail item information of each mail item in the malfunction mail item group. This can provide a source of information about which mail items cause which malfunctions in the handling system. More specifically, the mail item information may be indicative of which mail item characteristics lead to malfunctions in the handling system. Furthermore, it can be determined which mail item characteristics lead to which malfunctions. Based on this, analyses can be performed to adjust handling systems or to weed out potentially disruptive mail items before they enter the handling system. This information (i.e., mail item information and malfunction information) can be collected in real time and stored centrally or remotely. Further, this information can be made available in real time at other locations through a network. This makes it possible to share information across locations, which is particularly advantageous when the same handling systems are used at different locations. In this way, even new locations can be provided with experience already gained (mail item information and malfunction information), so that efficient operational adaptation is possible even for new locations.

Preferably, the malfunction information includes a position and/or a type of malfunction of the malfunction mail item when the malfunction occurs in the handling system. In other words, the malfunction information may be acquired for different positions in the handling system. For example, the handling system may be divided into a plurality of subsections, and a malfunction may be detected and/or acquired individually for each subsection. Thus, it can be determined exactly at which section the malfunction occurred in the handling system. Thus for each section in the handling system it can be determined which mail item characteristics lead to malfunctions. For example, the type of malfunction can be indicative of whether a mail item becomes jammed, lost, or otherwise causes a malfunction and/or is damaged in the handling system. This can provide information that can be taken into account when redesigning the handling system.

Preferably, the position of the malfunction mail item is determined based on a tracking of the malfunction mail item when passing through the handling system and/or preferably, the position of the malfunction mail item is determined based on an operating parameter of the handling system, in particular a transport speed of the mail items and/or a throughput of the handling system. The tracking may be a position tracking of the mail items handled in the handling system. For example, the tracking may be implemented by visually tracking the mail item as it passes through the handling system. Furthermore, an identification mark may also be arranged on the mail item, allowing tracking or tracing by the handling system. Furthermore, tracking may be realized by a monitoring system in the handling system. The monitoring system can be used to monitor a transport device of the handling system. For example, the handling system may include a weighing device that can determine a position of the mail item in the handling system based on the weight or load of the handling system. Further, the position of the mail item in the handling system may be identified by operating parameters of the handling system. For example, the time since the mail item has passed a monitored location in the handling system and/or outside the handling system (for example, the location where identification is performed) can be measured until a malfunction occurs. With the help of the measured time and the transport speed, which may be known as an operating parameter of the handling system, it is possible to infer the distance travelled and thus the position of the mail item in the handling system. Furthermore, a throughput of mail items through the handling system can be taken into account. Thus, it can be known how many mail items are in the handling system and a position can be assigned to these mail items, for example, as a malfunction mail item group. Furthermore, a distance between the mail items on a transport device can be known, whereby a position in the handling system can also be inferred. By determining the position in the handling system at which a malfunction occurs, the respective malfunction information occurring there can be assigned to the mail item information for different positions. Thus, it can be determined in a simple way which position or which place in the handling system can lead to problems in the operational sequence of the handling system. Furthermore, a position of a mail item can be determined by at least one light barrier. For this purpose, the monitoring system may comprise at least one light barrier that may output a position signal when a mail item passes. The monitoring system may measure a time between the identification of the mail item and a passing of a mail item of the light barrier. A known transport speed of the mail item can be used to determine which mail item it is. Thus, a position of the mail item in the handling system can be determined in a simple way.

Preferably, the mail item information includes a weight, a size, a length, a width, a height, a closure type, and/or a surface condition of the mail item. In other words, the mail item information may indicate a characteristic of the mail item. In particular, the characteristics may be characteristics that play a role in a handling of the mail item. The weight of the mail item may be the total weight of the contents and packaging of the mail item. The size of the mail item may be, for example, a volume that the mail item occupies in space. A length, a width, and/or a height may describe the dimensions of the mail item in three-dimensional space. In each case, only one or two dimensions may be specified. Depending on the handling system, it may be of interest to know only one dimension. Furthermore, all three dimensions may also be included in the mail item information. For example, a closure type may describe whether the mail item is closed with an adhesive tape, a string, a band, a hook element or the like. This may be particularly relevant in a handling system where the mail item is to be gripped by a suction gripping device. For example, an adhesive tape provided in sections may have a different characteristic than the rest of the mail item. Further, cords, strings, or tapes may play a role in handling with certain handling systems and thus may be stored in the mail item information. The surface condition can play a role in an assessment of how the mail item is to be gripped. By storing the individual characteristics of a mail item in the mail item information, any malfunctions that occur can be directly traced back to certain characteristics of the mail items. As a result, mail items that exhibit certain characteristics can be specifically ejected before they enter a handling system. Alternatively or additionally, the handling system can be adapted in such a way that mail items with characteristics that have been subject to malfunctions in the past can be handled by the handling system without any problems.

Preferably, the method can include outputting a signal based on the malfunction information. For example, it may be indicated at a central location that a malfunction has occurred in a handling system. This allows a user to quickly respond to and correct a malfunction. Preferably, the signal may comprise a location and/or section in the handling system where the malfunction occurred. This allows for quick identification of exactly where the problem exists. Furthermore, the signal can comprise mail item information, so that it can be easily recognized which mail item or which characteristics of a mail item have led to the respective malfunction.

Preferably, the method further comprises determining evaluation information indicative of a manageability of a mail item in the handling system, wherein the evaluation information is preferably determined based on the mail item information of the mail item, and wherein the evaluation information is further determined based on the interference information associated with the mail item information of mail items previously delivered to the handling system. Thus, the evaluation information may provide an evaluation for each mail item as to whether or not the mail item can be handled by the handling system. Preferably, the evaluation information of a mail item may be determined before the mail item is fed to the handling system. Thus, a malfunction in the handling system can be avoided. Preferably, the evaluation information is determined at an identification unit at which the mail item information is obtained. For example, the evaluation information can be determined based on previously obtained experience with mail items or with characteristics of mail items. More specifically, by associating the malfunction information with mail item information of a plurality of previously handled mail items, a basis can be created on which currently fed mail items can be evaluated. i.e., evaluation information can be created for currently fed mail items that can provide an indication of whether or not the mail item will cause a malfunction in the handling system. Based on the data basis, the evaluation information can include a probability which states with which probability the mail item can be handled by the handling system without a malfunction. In a further step, an evaluation can take place that ejects mail items above a certain probability of causing a malfunction in the handling system before feeding the mail item to the handling system. In this way, the system as a whole can be made more reliable and the occurrence of malfunctions can be reduced.

Preferably, the evaluation information is indicative of the sections of the handling system in which a mail item cannot be handled. In this sense, the term "cannot be handled" may mean that the mail item is highly likely to cause a malfunction and/or be damaged in a particular section of the handling system. By specifying with location accuracy at which section the mail item is likely to cause a malfunction in the handling system, a bypass around that location can also be specifically established. Thus, the entire handling system does not have to be bypassed, but only a section of the handling system can be bypassed by the mail item. Furthermore, estimates can also be made as to which mail item characteristics will probably lead to malfunctions in which section of the handling system. This makes it possible to design the handling system precisely for mail items with specific characteristics that are to be expected.

Preferably, the determining is performed with a classifier. In other words, the determination of evaluation information can be performed with a classifier. The classifier can be a comparator that compares currently available mail items or their characteristics with stored mail items or stored characteristics of mail items. If a match occurs (i.e., the stored information matches the currently identified information), the classifier can determine whether a malfunction has occurred in the handling system in the past for the stored mail item information. If malfunctions have already occurred, corresponding evaluation information can be determined. In this way, it can be avoided that mail items, which have already caused malfunctions in the past, are again fed to the handling system. Furthermore, it can happen that a mail item has been handled by the handling system a few times without any problems and has caused malfunctions a few other times. In this case, the evaluation information can be determined based on a ratio between the successful clearances and the unsuccessful clearances. This offers the advantage that it can be individually set how strictly the evaluation information should be determined. If, for example, it is desired that as few malfunctions as possible should occur, it can be specified that the ratio should be zero. Only in this case, the evaluation information can then be indicative that the mail item can be handled in the handling system. Accordingly, a customization possibility can be created that allows to provide an operation of the handling system based on the evaluation information that can be adapted to individual requirements.

Preferably, the classifier comprises a neural network or a learning algorithm. For example, the classifier may be a learning algorithm that may be configured to map input data to desired output data. Learning may refer to the characteristic that the algorithm can define a general model with parameters. The mapping of input data to output data may be a mathematical function that depends on parameters. The algorithm may learn the mapping of input data to output data by setting its parameters for given pairs of input data (training input data) and desired output data (training output data) such that the output of the algorithm is as similar as possible to the desired output. The similarity can be defined by a mathematical cost function (i.e., a mapping that takes the output and desired output of the learning algorithm as input and converts it to a real number) that must be specified by a user (e.g., a developer). The lower the value (i.e., real number) of the cost function, the more similar the output is to the desired output. The learning algorithm can be just as much a neural network. Accordingly, the learning algorithm can be trained. Furthermore, the learning algorithm can also be retrained. Retraining can be done similarly to training. The difference is that when the learning algorithm is trained, it can start with random values for its parameters. On the other hand, when the learning algorithm is retrained, it can start with the values of a previously trained learning algorithm. Therefore, re-training the learning algorithm can be faster and more efficient compared to the training step. A training set can be used to train the learning algorithm. When using a learning algorithm or a neural network, the advantage is that the classifier can output evaluation information even in the case where the currently present mail item has never been fed to the handling system in this way in the past. In other words, the classifier can also make an estimate of whether a malfunction will occur when the mail item is fed to the handling system if the mail item or a mail item with the characteristics of the currently present mail item has never been fed to the handling system before. In this way, evaluation information can be reliably generated even with a smaller data basis and operation of the handling system can be improved.

Preferably, a separate classifier is provided for each of at least two sections in the handling system. In other words, there can be a large number of classifiers for the handling system, each of which individually determines evaluation information. This offers the advantage that evaluation information can be determined position-individually or position-exactly for different sections in the handling system. For example, a mail item may pass through one section of the handling system without any problems, whereas the same mail item may cause a malfunction at another section of the handling system. By providing several classifiers, it can be determined precisely where the respective mail item can cause a malfunction in the handling system. This makes it easy to identify problem areas.

Preferably, the classifiers for the at least two sections in the handling system differ in their training data. In other words, the training data comprises malfunction information corresponding to a position corresponding to the section for which the classifier is to be trained. As a result, the classifiers can be trained with different training data and thus provide different results. This enables highly accurate analyses of where malfunctions may occur in the handling system.

Preferably, the system further comprises ejecting a mail item based on the evaluation information so that the ejected mail item is not fed to the handling system. Thus, mail items that are expected to cause a malfunction in the handling system or to be damaged themselves can be ejected before being fed to the handling system. Such an ejection can be done, for example, by means of a switch and/or by means of a robot. In this way, a mail item in which a malfunction is to be expected can be removed from the process. Depending on where a malfunction is expected in the handling system by the mail item, the mail item can also bypass only the section where the malfunction is expected. This can make the overall system more resistant to malfunction.

Preferably, the ejection is implemented by a robot and/or a branch in the transport mechanism for mail items. This ensures that after the mail item has been identified, it is reliably separated from the other mail items that are fed to the handling system. At a later point in time, the ejected mail item can be returned to the process.

Preferably, the method further comprises modifying or adapting an operation of the handling system based on the malfunction information associated with the mail item information. In other words, the handling system may be modified based on the malfunction information and the mail item information. For example, sections of the handling system that repeatedly cause malfunctions with certain mail items or certain characteristics of mail items can be constructively redesigned so that malfunctions can be avoided. This offers the advantage that the handling system itself can be easily adapted in operation to currently existing or expected operating conditions (i.e. certain mail items with certain characteristics). As a result, the handling system can be designed to be more robust. Furthermore, a customer who operates the handling system can adapt it to his own requirements. Furthermore, changing or adapting an operation of the handling system can also be based on the evaluation information. Thereby an even more precise adaptation of the handling system can be realized.

In accordance with another aspect of the present invention, there is provided a method for training or retraining a classifier to determine evaluation information about mail items to be fed to a handling system, wherein the method comprises: Receiving input training data, namely mail item information, and receiving output training data, namely malfunction information associated with the mail item information. Thus, a classifier that is not in operation can be trained with data from a previous operation. Thus, even when an operation is restarted, the classifier can directly determine evaluation information that can predict which mail item is likely to cause a malfunction in the handling system and which is not. In the case of training, it may be an untrained classifier whose parameters are set arbitrarily. In contrast, when the classifier is retrained, it may be a classifier that has already been trained and has parameters that have already been adjusted. In this case, the parameters can only be adapted to new circumstances. The retraining has a higher efficiency, because it can be realized in a shorter time.

According to another aspect of the present invention, there is provided a computer program that includes instructions that, when the program is executed by a computing unit, cause the computing unit to perform the method according to any of the above embodiments. This applies to the method for analyzing malfunctions in an operation of a handling system, and for training or retraining a classifier to determine evaluation information about a mail item to be fed in the handling system. Alternatively, the classifier may be implemented as hardware, for example with fixed connections on a chip or other computing unit. The computing unit that can perform the method according to the invention may be any processing unit such as a CPU (central processing unit) or GPU (graphics processing unit). The processing unit can be part of a computer, a cloud, a server, a mobile device such as a laptop, tablet computer, cell phone, smartphone, etc. In particular, the computing unit may be part of a handling system.

Furthermore, the invention relates to a computer-readable medium that contains instructions which, when executed by a computing unit, cause the computing unit to perform the method according to the invention, in particular the above method. Such a computer-readable medium may be any digital storage medium, for example a hard disk, a server, a cloud or a computer, an optical or a magnetic digital storage medium, a CD-ROM, an SSD card, an SD card, a DVD or a USB or other memory stick.

In accordance with another aspect of the present invention, there is provided a system for analyzing malfunctions in a handling system operation, wherein the handling system is configured to handle mail items, wherein the system comprises: a supply unit for supplying mail items to a handling system, an identification unit for identifying mail items supplied on the supply unit to the handling system to obtain mail item information, and a malfunction detection unit for detecting a malfunction in an operation of the handling system to obtain malfunction information, a control unit adapted to associate the malfunction information with the mail item information.

Preferably, the control unit is configured to perform the method according to any of the above embodiments.

According to another aspect of the present invention, there is provided a mail item handling system comprising a system according to any of the above embodiments and a sorter configured to deliver mail items to a particular terminal location. The sorter may be located downstream of the handling system. The identification unit may be arranged upstream of the handling system.

Furthermore, the system can include a bypass route that connects the identification unit directly to the sorter. Thus, a mail item can be fed directly from the identification unit to the sorter via the bypass line, bypassing the handling system. In this way, mail items that are likely to cause malfunctions in the handling system can bypass it and be made available directly to a further process.

Individual features or embodiments of the embodiments shown above can be combined with other features or other embodiments to form new embodiments. Further developments and characteristics of the features or the embodiments then apply analogously to the new embodiments. Advantages and embodiments given in connection with the methods apply analogously also to the device and vice versa.

BRIEF DESCRIPTION OF THE DRAWINGS

In the following, embodiments to be preferred are described with reference to the figures.

FIG. 4 is a schematic flow diagram of a process according to one embodiment of the present invention.

DETAILED DESCRIPTION OF THE PREFERRED EMBODIMENTS

Figure 1:
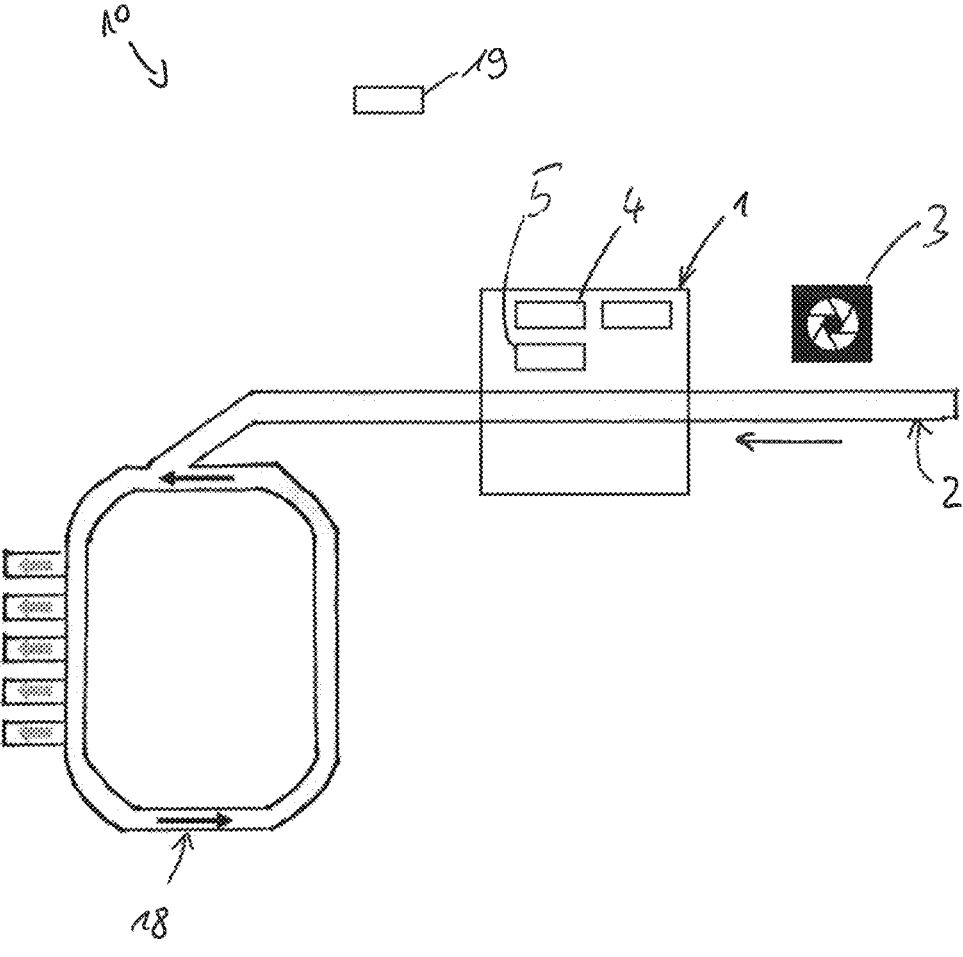
FIG. 1 is a schematic representation of a system according to one embodiment of the present invention.

FIG. 1 schematically shows a system 10 for analyzing malfunctions during operation of a handling system 1. The system 10 comprises a supply unit 2, which is designed to feed mail items 12 (not shown in FIG. 1) to a handling system 1 in the direction of transport (see arrow, from the right side of the picture to the left side of the picture). The supply unit 2 transports the mail item 12 to a mail item identification unit 3, which is designed to identify the mail items 12 in order to obtain mail item information. The identification unit 3 has at least one camera that can identify characteristics of the mail item. Then, the mail item 12 can be further transported on the supply unit 2 towards the handling system 1. If a malfunction occurs in the handling system 1, a malfunction detection unit 4 provided in the handling system 1 can detect the malfunction and obtain malfunction information. A control unit 5 is adapted to associate the malfunction information obtained by the malfunction detection unit 4 with mail item information obtained by the identification unit 3. Further, the control unit 5 is configured to supply the control information associated with the mail item information to a display unit 19 so that the control information associated with the mail item information can be displayed (e.g., visualized) therein. Thus, it can be made possible for a user to recognize in a simple manner which mail items lead to malfunctions in the handling system 1. For this purpose, the mail item information may include further details about the mail items, such as size, weight, length, width, height, surface condition and other materials provided on the mail items.

Figure 2:
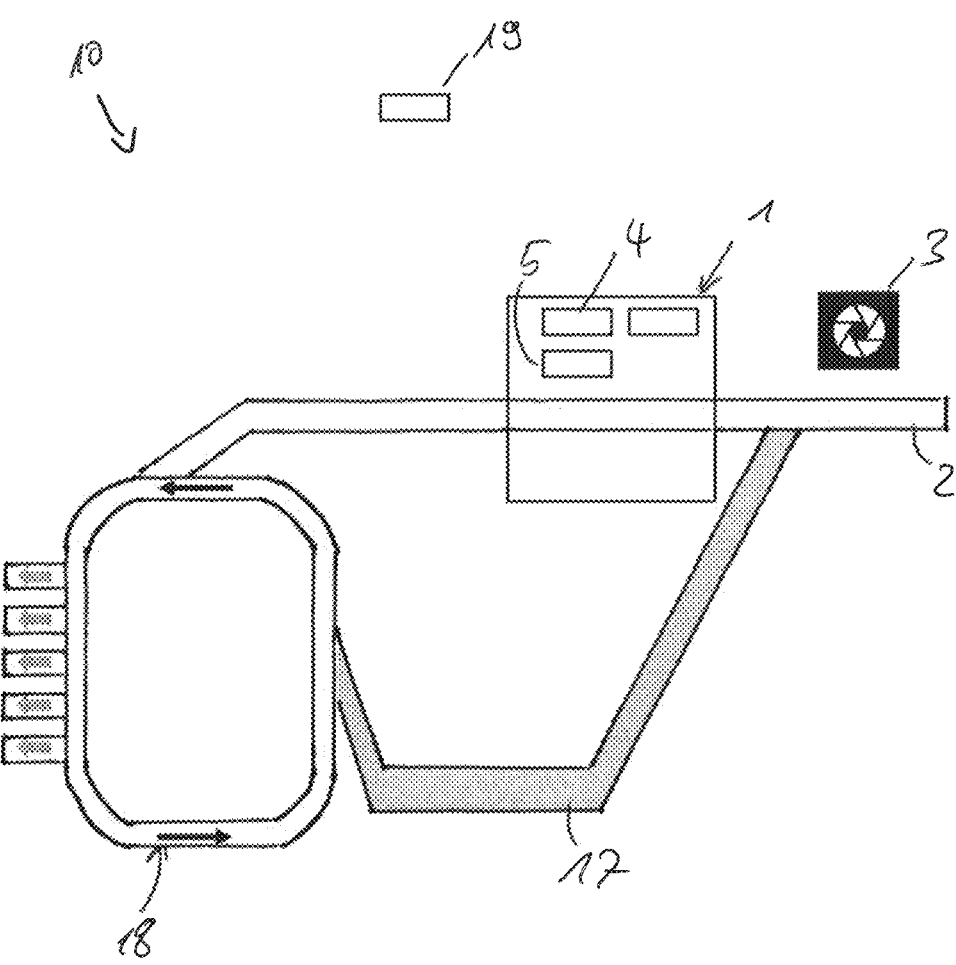
FIG. 2 is a schematic representation of a system according to a further embodiment of the present invention.

FIG. 2 shows a system according to a further embodiment of the present invention. The system shown in FIG. 2 is based on the system shown in FIG. 1 with the difference that a bypass 17 is provided which is designed to eject mail items 5 downstream of the identification unit 3 and to feed them to a sorter 18 while bypassing the handling system 1. Thus, in the present embodiment, it is possible not only to identify which mail items may cause problems in the handling system 1, but also to eject these mail items directly so that these mail items 5 are not fed to the handling system 1. In this way, the occurrence of malfunctions can be actively avoided. Nevertheless, also in the present embodiment, the malfunction information associated with the mail item information can be displayed by means of the display unit 19.

Figure 3:
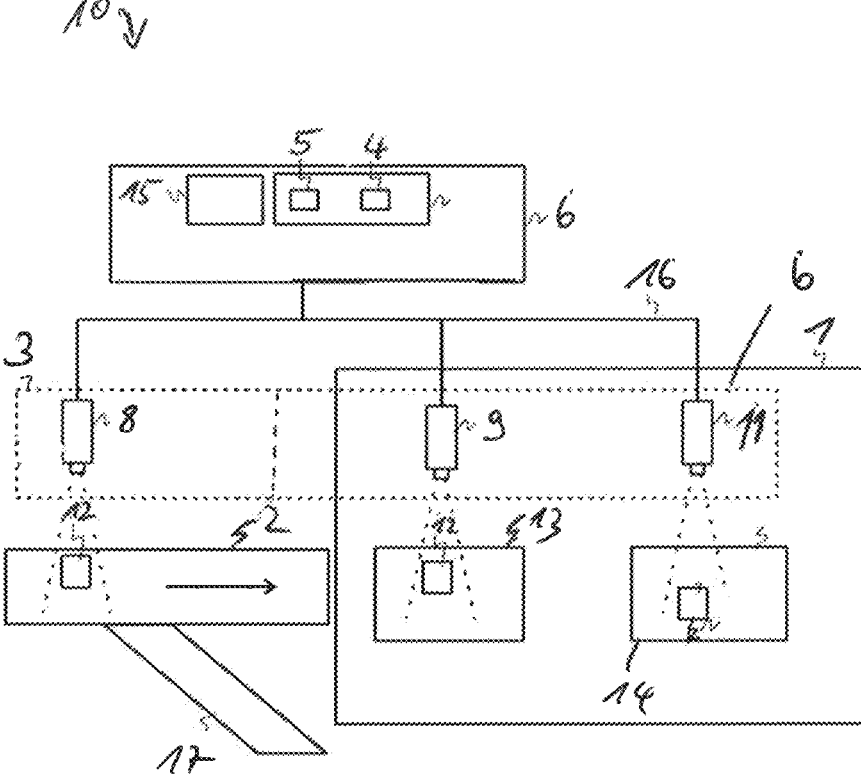
FIG. 3 is a schematic representation of a system according to a further embodiment of the present invention.

FIG. 3 schematically shows another system 10 according to a further embodiment of the present invention. In the system shown in FIG. 3, the transport direction is now from the left side to the right side. Furthermore, the present embodiment also has an identification unit 3. The identification unit 3 comprises a first camera 8 configured to obtain the mail item information by identifying the mail items 12. Further, a monitoring unit 6 is provided, comprising a second camera 9 and a third camera 11. The second camera 9 and the third camera 11 are configured to track the mail items 12 as they pass through the handling system 1. Thus, the positions of the mail items 12 in the handling system 1 can be determined. In the present embodiment, the second camera 9 is configured to detect when a mail item 12 is positioned at a first section 13 of the handling system 1. Further, the third camera 11 is configured to detect when a mail item 12 is positioned at the second section 14 of the handling system 1. Furthermore, the present embodiment comprises a data memory 15 in which the already obtained data (i.e. information) can be stored. The individual systems of the present embodiments are interconnected by means of a data line 16. The data line 16 may be a physical line or a wireless line.

Figure 4:
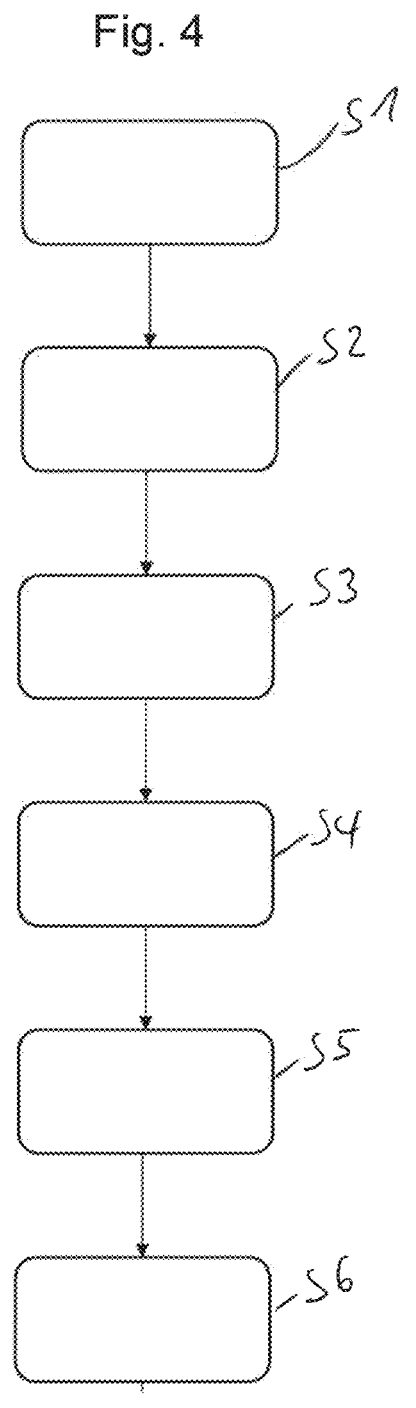

FIG. 4 shows a schematic flow diagram of a method according to one embodiment of the present invention. In a first step S1, at least one feature of a mail item to be fed to the handling system 1 is identified to obtain mail item information. Then, in a second step S2, a malfunction in an operation of the handling system 1 is detected to obtain malfunction information. In a third step S3, at least one malfunction mail item or group of malfunction mail items that caused the malfunction is determined. Finally, in a fourth step S4, the malfunction information is associated with the mail item information of the malfunction mail item or malfunction mail item group. In this way, information can be provided that enables the identification of mail items that repeatedly lead to malfunctions. Furthermore, it can be identified where which mail items or which mail item characteristics cause malfunctions in the handling system. In a further embodiment, the method comprises a fifth step S5, in which a signal is output based on the malfunction information. Preferably, the signal is output on a display unit 19. Optionally, a sixth step S6 may be provided in which evaluation information indicative of a handleability of a mail item in the handling system is determined. The evaluation information is based on the mail item information of the mail item and on the malfunction information associated with the mail item information of mail items previously fed to the handling system.

Based on the embodiments shown above, a handling system can be made more resistant to malfunction in a targeted manner. Furthermore, malfunction mail items can be ejected before they cause a malfunction or are damaged themselves.

LIST OF REFERENCE SIGNS

1 Handling system
2 Supply unit
3 Identification unit
4 Malfunction detection unit
5 Control unit
6 Monitoring unit
8 First camera
9 Second camera
10 System
11 Third camera
12 Mail item
13 First section
14 Second section
15 Memory
16 Data line
17 Bypass
18 Sorter
19 Display unit

What is claimed:

1. A method for analyzing malfunctions in an operation of a handling system configured to handle mail items, comprising:
   identifying at least one characteristic of a mail item to be fed to the handling system to obtain mail item information;
   detecting a malfunction in an operation of the handling system to obtain malfunction information;
   determining at least one malfunction mail item or group of malfunction mail items that triggered the malfunction; and
   assigning the malfunction information to the mail item information of the at least one malfunction mail item or the group of malfunction mail items.

2. The method according to claim 1, further comprising:
   changing or adjusting an operation of the handling system based on the malfunction information associated with the mail item information.

3. The method according to claim 1, wherein the determining is performed with a classifier.

4. The method according to claim 3, wherein the classifier includes a separate classifier for each of at least two sections in the handling system.

5. The method according to claim 1, further comprising:
   determining evaluation information indicative of a manageability of a mail item in the handling system, wherein the evaluation information is determined based on the mail item information of the mail item, and wherein the evaluation information is further determined based on the malfunction information associated with the mail item information of mail items previously delivered to the handling system.

6. The method according to claim 5, wherein the evaluation information is further indicative of in which section of the handling system a mail item cannot be handled.

7. The method according to claim 5, further comprising:
   ejecting a mail item based on the evaluation information so that the ejected mail item is not fed to the handling system.

8. The method according to claim 1, wherein the malfunction information comprises a position and/or a malfunction type of the at least one malfunction mail item or the group of malfunction mail items when the malfunction occurs in the handling system.

9. The method according to claim 8, wherein the position of the malfunction mail item is determined based on tracking of the at least one malfunction mail item as it passes through the handling system, and/or wherein the position of the at least one malfunction mail item is determined based on an operating parameter of the handling system.

10. The method according to claim 9, wherein the operating parameter of the handling system includes a transport speed of the mail items and/or a throughput of the handling system.

11. The method according to claim 9, further comprising:
   determining evaluation information indicative of a manageability of a mail item in the handling system, wherein the evaluation information is determined based on the mail item information of the mail item, and wherein the evaluation information is further determined based on the malfunction information associated with the mail item information of mail items previously delivered to the handling system.

12. The method according to claim 5, wherein the evaluation information is further indicative of in which section of the handling system a mail item cannot be handled.

13. The method according to claim 5, wherein the determining is performed with a classifier.

14. The method according to claim 13, wherein the classifier includes a separate classifier for each of at least two sections in the handling system.

15. The method according to claim 5, further comprising:
   ejecting a mail item based on the evaluation information so that the ejected mail item is not fed to the handling system.

16. The method according to claim 15, further comprising:
   changing or adjusting an operation of the handling system based on the malfunction information associated with the mail item information.

17. A method for training or retraining a classifier to determine evaluation information about mail items to be fed to a handling system, the method comprising:
   receiving input training data including mail item information; and
   receiving output training data including malfunction information associated with the mail item information.

18. A non-transitory computer readable medium having stored thereon software instructions that, when executed by a processor, causes the processor to perform the method of claim 1.

19. A system for analyzing malfunctions in an operation of a handling system configured to handle mail items, comprising:

a supply unit configured to feed mail items to a handling system;

an identification unit configured to identify mail items fed to the handling system on the supply unit in order to obtain mail item information;

a malfunction detection unit configured to detect a malfunction in an operation of the handling system to obtain malfunction information; and a control unit configured to assign the malfunction information to the mail item information.

* * * * *